July 13, 1965  E. D. MANNHERZ ETAL  3,194,068
MAGNETIC FLOWMETER
Filed Feb. 28, 1961  2 Sheets-Sheet 2

INVENTORS
ELMER D. MANNHERZ &
BY JOHN J. McDERMOTT

ATTORNEYS

United States Patent Office 3,194,068
Patented July 13, 1965

3,194,068
MAGNETIC FLOWMETER
Elmer D. Mannherz, Southampton, and John J. McDermott, Lansdale, Pa., assignors to Fischer & Porter Company, Warminster, Pa., a corporation of Pennsylvania
Filed Feb. 23, 1961, Ser. No. 92,268
5 Claims. (Cl. 73—194)

This invention relates to magnetic flowmeters of the type in which a potential induced in a liquid flowing through a magnetic field is utilized as a measure of quantity of flow.

As is well known, the current or potential outputs produced in a flowmeter of the magnetic type are very small for ordinary flows to be measured. Currents are particularly small when the fluid which is being measured has a high resistivity. It is accordingly necessary to design a flowmeter in such fashion as to maximize the output, subect to such limitations as the strength of the magnetic field or other factors which are involved in the magnitude of the output. If a conductive conduit is used, uninsulated from the flowing liquid, and assuming electrodes presenting only small areas to the liquid, these being locally insulated from the conduit, it will be evident that the conductive conduit has a very substantial short-circuiting action, highly detrimental to the attainment of a satisfactory output. Accordingly, it has been customary to use in the past either conduits of insulating material or insulating linings within metal conduits. Conduits made entirely of insulating material are expensive if high pressures must be contained, and accordingly under high pressure conditions, as well as others, the choice has generally been in the direction of providing metal conduits lined with insulating material throughout such extended lengths as might be materially involved in the short-circuiting action.

The lining of a conduit with a cylindrical layer of insulating material has a number of disadvantages. Insulators which will withstand high temperature are substantially rigid, and differential expansion between the liner and the metal conduit results in breakage or pealing. Not only may this be due to mechanical stresses, but if the metal conduit expands away from the liner, the internal pressures must be withstood by the liner alone which is then subject to bursting.

It is the general object of the present invention to provide a flowmeter construction which provides a sufficient avoidance of short-circuiting action to render a flowmeter satisfactory, but at the same time avoids the problems of complete insulation. In brief, in accordance with the invention, regions in the immediate vicinity of the electrodes are provided with insulating barriers which are locally secured to the conduit either solely at the electrodes or at only a small number of points, being elsewhere free.

The foregoing general objects, as well as others relating to details of construction and operation will become apparent from the following description, read in conjunction with the accompanying drawings, in which.

While a particular flowmeter is illustrated, and will be described herein, it will be evident that the invention may be applied to flowmeters having different constructions, and, in particular, different electrical systems for the measurement of the flow. To present a consistent picture, however, the disclosure, particularly in its electrical aspects, follows that of the application of Kass, Serial No. 768,595, filed October 21, 1958 now Patent 3,094,000. Reference may be made to that application for details.

Figure 1:
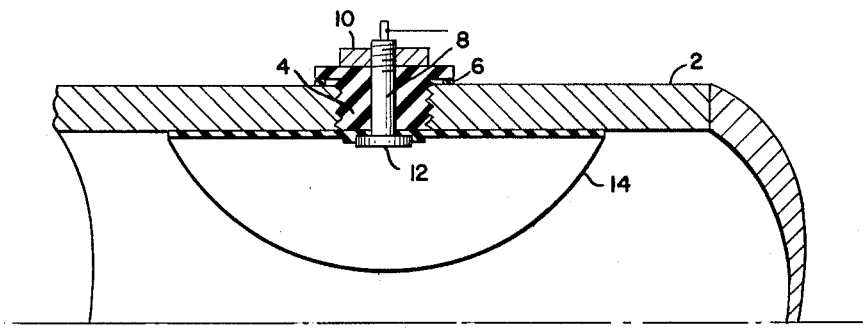
FIGURE 1 is a fragmentary sectional view showing the invention applied to one of the electrodes of a flowmeter.
Figure 2:
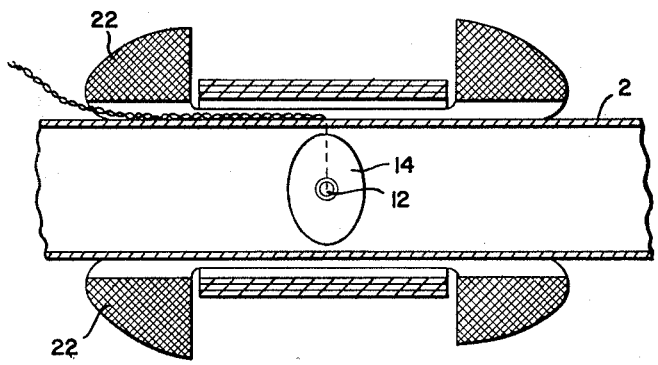
FIGURE 2 is an axial section taken at right angles to that of FIGURE 1 and showing the relationship of the magnetic field producing means to the electrodes.

Referring first to FIGURES 1 and 2, there is indicated at 2 a portion of the conduit of a magnetic flowmeter which is in the vicinity of the magnetic field and the electrodes. This conduit is metallic, and irrespective of the particular metal used, it will, ordinarily, have a resistivity much lower than that of the liquid whose flow is being measured. The metal used, of course, depends on the liquids involved, and may be stainless steel, copper, aluminum, or other metal. At the axial location where measurement is to be made, there are located in the walls of the conduit 2 insulating bushings 4 at diametrically opposite points. Each bushing is provided with a gasket 6 to prevent leakage, and through it there extends the shank 8 of an electrode 12 illustrtaed as secured in position by a nut 10. In accordance with the specific form of the invention shown, associated with each such electrode assembly is a plate of insulating material 14, provided with a central opening about which the head of the electrode 12 clamps this insulating plate to hold it in position. The specific mode of assembly may obviously be widely varied; all that is required in accordance with the invention is that the inner face of the electrode should be exposed, and that the plate 14 should be secured in such fashion that no liquid between the plate and the inner wall of the conduit will contact the stem or other part of the electrode. It is desirable that the exposed face of the electrode should project slightly inwardly of the plate 14 to provide good contact with the liquid and facilitate the mechanical carrying away of bubbles or of solid or other materials.

Reference may now be made particularly to the significant aspect of the plates 14. If such a plate were assumed absent, it is evident that the close relationship between an electrode 12 and the nearest portion of the interior surface of the conductive conduit 2 would be so close that the conduit would constitute a short-circuit of the electrical configuration involved, causing an extreme deterioration of the output signal magnitude. However, if a plate 14 is provided in association with each of the electrodes, and extends to a substantial degree both circumferentially and axially about the electrode 12, the short circuiting action is reduced.

The desirable requirements for the insulating plates 14 are as follows:

First, each should desirably conform to the cylindrical inner surface of the conduit. This requirement is primarily dictated by the desirability of keeping the passage through the conduit as open as possible for free flow, and the avoidance of the hanging up of solid materials or their entrapment between the plate and the wall of the conduit. This end is achieved by making the plate 14 of rigid material, and this is consistent with the fact that insulating materials capable of withstanding high temperatures are rigid. A thickness is used which will insure continuous rigidity despite impact in those cases where the flowing material may contain solids. The actual materials used are subject to an extremely wide choice from available insulating materials. Thermosetting resins may be used, of which typical ones would be those of phenol-formaldehyde type, which may be laminated. Numerous other materials may be used depending on the type of use which is to be involved. Other typical materials are Teflon, ceramic or the like.

One of the significant aspects of the invention is that the plate 14 is desirably held at only a single point, this holding being at the location of the electrode. As already noted, the space radially exterior of the plate 14 should be closed adjacent to the electrode to prevent any short-circuiting to the conduit by a film of conductive liquid. Except for this matter of sealing, the plate 14 is desirably free of the wall throughout the rest of its extent so that a film of liquid may enter behind it. As will be evident, this completely avoids the possibility that differential expansion might result in a closed chamber which would be subject to high pressure acting on the interior of the plate 14 with resulting possibility of rupture or cracking. Subject to these considerations, however, other local points of securing may exist, as, for example, by elastic adhesive material.

If the plate 14 is only of limited extent about the electrode, it might consist merely of a circular disc of the insulating material mounted on the electrode assembly and extending chordally with respect to the inner surface of the conduit. However, usually a greater area of the plate will be desired surrounding the electrode, and such a chordal relationship would be unsatisfactory. Therefore, it is most desirable to provide the plate 14 in the form illustrated, in which, though having a circular or oval outline, it conforms both axially and circumferentially with the interior of the conduit. If the material used is of a spring-like type, it may be supplied as a plane element flexed and drawn into conformity with the conduit wall as the assembly is made.

Obviously most desirable would be a pair of plates 14, one associated with each electrode, extending, conjointly, about the entire circumference of the interior of the conduit and extending axially on both sides of the electrode as far as possible. However, the effectiveness of the shielding action is still very high even if the extents of the plates 14 are quite limited. For example, and as illustrated, the axial extent of the plate 14 may be of the same order as the diameter of the conduit, while the circumferential extent may be through considerably less than 180°, without any great deterioration of its effectiveness. Its extent from the electrode in all directions may be even less, and to the extent that minimizing the areas of the plates is desirable from a mechanical standpoint, there may be made sacrifices in the aspect of effectiveness. It has been found, for example, that in a 1.5 inch diameter pipe, discs of ¾" diameter about the electrodes are usable.

The effectiveness is well measured by considering that what is desired is the maintenance of the shortest current flow line possible between an electrode and the metal conduit above a value dependent on the conduit diameter, or effective diameter if the conduit is other than circular in cross-section. To the extent that rigidity of a plate 14 is material, it is obvious that the smaller its area the thinner it may be.

The quantitative matters involved may be made clear from the following:

Starting with consideration of the maximum electrode output signal achieved when the insulation extends throughout the circumference of the interior of the conduit and axially at least several diameters of the conduit on both sides of the electrodes, if the axial extent of the liner is reduced to two diameters, one on each side of the electrodes, there is no significant change of signal magnitude. The same is true if, at a plane perpendicular to the diameter through the electrodes a 30° gap in the insulation is opened up on each side exposing the inner conducting face of the conduit.

If the decrease of insulated area is to one diameter axially, i.e. to 0.5 diameter extension on each side of the electrodes, the signal strength is reduced to about one-third of its maximum value.

If the angular gaps referred to above are increased to about 75° each, the signal strength is reduced to about one-half the maximum value.

Reduction in both of the last mentioned fashions, with adoption of an oval contour, results approximately in a 6:1 reduction of signal strength which may be tolerated in the case of liquids having appreciable conductivity, and these conditions are regarded as involving commercially practical limits on reduction of the insulating areas about the electrodes, consistently with maintenance of measurable signals above background noise.

It may here be noted that in cases where damaging impacts by solid materials in the liquid flow are not expected, the liner may be circumferentially continuous with the possibility that it may part substantially from the conduit walls between the electrodes, its elasticity permitting its deviation from a circular to an oval shape. So long as the liquid may enter between the liner and the conduit, bursting pressures will not exist.

Another alternative arrangement which may be used to close effectively any circumferential gaps is that involving insulating plates individual to the electrodes but overlapping at their circumferential ends for free relative sliding movements as expansion and contraction of the conduit occur.

For a full appreciation of the invention, there may now be described the associated matters which, as already noted, are set forth in detail in said Kass application. Windings 22 associated with an iron core structure provide a field which is at right angles to the diameter through the electrode. The field thus produced may be direct or alternating, but an alternating magnetic field is most useful for securing best results, and it may be assumed for further description that alternating field excitation is used.

Figure 3:
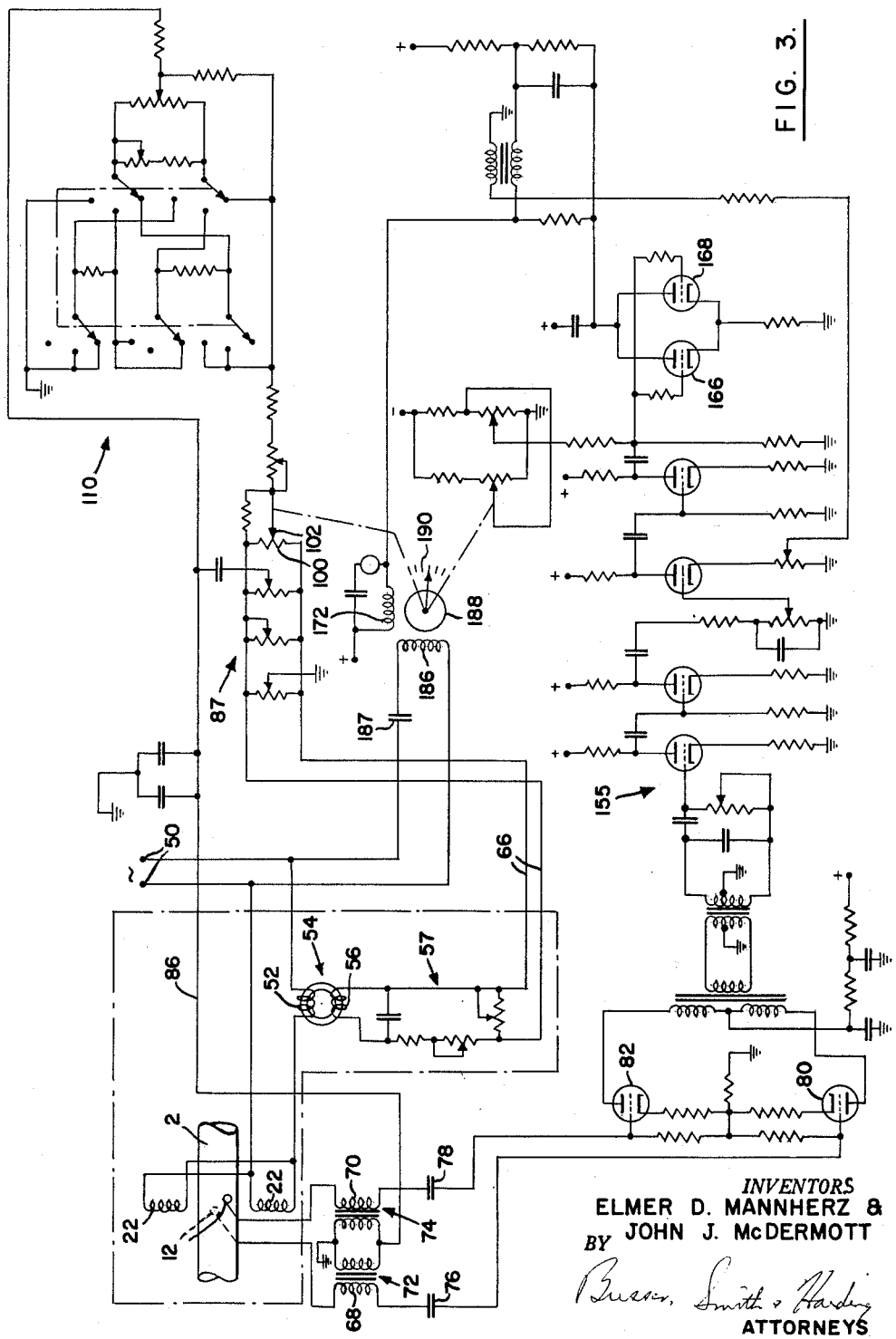
FIGURE 3 is a wiring diagram showing the electrical aspects of the flowmeter.

Referring now to FIGURE 3, alternating current is supplied from the terminals 50 connected to the usual power supply, for example at sixty cycles. The magnetic field windings 22 are connected in parallel and to the supply terminals. In series with the field windings there is the primary winding 52 of a toroidal transformer 54 the secondary winding 56 of which is connected to an adjusting network 57 from which an output is taken through lines 66.

The leads from the electrodes 12 are connected individually through the secondaries 68 and 70 of identical transformers 72 and 74, and through the capacitors 76 and 78 to the grids of input triodes 80 and 82 forming part of an amplifier generally indicated at 155. The primaries of the transformers 72 and 74 are connected in parallel between ground and a line 86 in such fashion that signals fed back through the line 86 will null the signals from the electrodes, the connection being such that opposition to the electrode potential is provided by each transformer.

The line 86 receives current from the lines 66 previously mentioned through a network 87 and a range adjustment network 110. The network 87 comprises adjustments for centering, setting the input resistance, and for manual null control of quadrature signals. It also includes a potentiometer 100 provided with a contact 102 which is driven by a motor 188 to effect automatic balancing of the circuit and provide on a scale 190 a direct indication of flow.

The amplifier 155 terminates in a pair of power tubes 166 and 168 operating as a class C stage. This stage supplies current to the field winding 172 of the motor 188, the other field winding 186 of this motor being provided with current from the terminals 50 through the phase adjusting capacitor 187.

The operation of the measuring system is described in detail in said Kass application, and since the details of operation are not of special significance in connection with the present invention it will suffice to point out that when the circuit in FIGURE 3 is not balanced inputs are provided to the triode 80 and 82 and through the amplifier 155 the motor 188 is operated in one direction or the other, as required to attain balance, with resulting provision of a signal through connection 86 to balance the circuit, i.e. to provide zero in-phase signals to the triodes 80 and 82. When balance has been thus achieved (through adjustment of contact 102 of potentiometer 100) the flow may be directly read on the scale 190.

It will be evident that other indicating or recording devices may be used, with full achievement of the advantageous results of the invention. It will also be clear that various details of construction may be changed without departing from the scope of the invention as defined in the following claims.

What is claimed is:

1. A flowmeter comprising an electrically conductive conduit for flowing liquid having an uninsulated inner surface, electromagnetic means providing a magnetic field transverse to said conduit, means supplying current to said electromagnetic means, electrodes insulated from said conduit, exposed to liquid flowing through said conduit, and located on a line extending transversely through said field to pick up signals generated by flow of liquid through said field, means connected to said electrodes for measuring said signals, and a member individual to at least one of said electrodes providing electrical insulation through a region of such substantial extent surrounding the last mentioned electrode and adjacent to the inner surface of said conduit as to make negligible leakage between said electrode and the inner surface of the conduit, said member being unconnected to said conduit except in the immediate vicinity of its electrode.

2. A flowmeter comprising an electrically conductive conduit for flowing liquid having an uninsulated inner surface, electromagnetic means providing a magnetic field transverse to said conduit, means supplying current to said electromagnetic means, electrodes insulated from said conduit, exposed to liquid flowing through said conduit, and located on a line extending transversely through said field to pick up signals generated by flow of liquid through said field, means connected to said electrodes for measuring said signals, and a member individual to at least one of said electrodes providing electrical insulation through a region of such substantial extent surrounding the last mentioned electrode and adjacent to the inner surface of said conduit as to make negligible leakage between said electrode and the inner surface of the conduit, said member being unconnected to said conduit except in the immediate vicinity of its electrode, the insulating assembly at the last mentioned electrode preventing any conductive path exterior of said member between that electrode and any liquid between the member and the portion of the conduit adjacent thereto.

3. A flowmeter comprising an electrically conductive conduit for flowing liquid having an uninsulated inner surface, electromagnetic means providing a magnetic field transverse to said conduit, means supplying current to said electromagnetic means, electrodes insulated from said conduit, exposed to liquid flowing through said conduit, and located on a line extending transversely through said field to pick up signals generated by flow of liquid through said field, means connected to said electrodes for measuring said signals, and a pair of members, each individual to one of said electrodes providing electrical insulation through a region of such substantial extent surrounding its electrode and adjacent to the inner surface of said conduit as to make negligible leakage between its associated electrode and the inner surface of the conduit, but short of the other electrode, each said regions providing an electrical configuration such that the shortest flow line of current between its electrode and the inner surface of the conduit is of a length which is such a substantial fraction of the distance between the electrodes as to make negligible its effect on electrode signals as compared with a condition involving complete insulation of the inner surface of the conduit.

4. A flowmeter comprising an electrically conductive conduit for flowing liquid having an uninsulated inner surface, electromagnetic means providing a magnetic field transverse to said conduit, means supplying current to said electromagnetic means, electrodes insulated from said conduit, exposed to liquid flowing through said conduit, and located on a line extending transversely through said field to pick up signals generated by flow of liquid through said field, means connected to said electrodes for measuring said signals, and a pair of members, each individual to one of said electrodes providing electrical insulation through a region of such substantial extent surrounding its electrode and adjacent to the inner surface of said conduit as to make negligible leakage between its associated electrode and the inner surface of the conduit, said member being unconnected to said conduit except in the immediate vicinity of its electrode.

5. A flowmeter comprising an electrically conductive conduit for flowing liquid having an uninsulated inner surface, electromagnetic means providing a magnetic field transverse to said conduit, means supplying current to said electromagnetic means, electrodes insulated from said conduit, exposed to liquid flowing through said conduit, and located on a line extending transversely through said field to pick up signals generated by flow of liquid through said field, means connected to said electrodes for measuring said signals, and a pair of members, each individual to one of said electrodes providing electrical insulation through a region of such substantial extent surrounding its electrode and adjacent to the inner surface of said conduit as to make negligible leakage between its associated electrode and the inner surface of the conduit, said member being unconnected to said conduit except in the immediate vicinity of its electrode, the insulating assembly at the last mentioned electrode preventing any conductive path exterior of said member between that electrode and any liquid between the member and the portion of the conduit adjacent thereto.

References Cited by the Examiner

UNITED STATES PATENTS

| | | | |
|---|---|---|---|
| 2,170,718 | 8/39 | Humphries | 174—152.2 |
| 2,515,221 | 7/50 | Henning | 73—194 |
| 2,579,973 | 12/51 | Schlosser | 174—152 |
| 2,844,568 | 7/58 | Mertz | 73—194 |
| 2,949,551 | 8/60 | Sturgeon | 73—194 |
| 3,078,709 | 2/63 | Clark | 73—194 |

RICHARD C. QUEISSER, *Primary Examiner.*

ROBERT L. EVANS, JOSEPH P. STRIZAK,
*Examiners.*